(12) United States Patent
Drummond et al.

(10) Patent No.: US 11,893,207 B2
(45) Date of Patent: Feb. 6, 2024

(54) GENERATING A SEMANTIC CONSTRUCTION OF A PHYSICAL SETTING

(71) Applicant: Apple Inc., Cupertino, CA (US)

(72) Inventors: Mark Drummond, Palo Alto, CA (US); Bo Morgan, Emerald Hills, CA (US); Siva Chandra Mouli Sivapurapu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 185 days.

(21) Appl. No.: 17/475,004

(22) Filed: Sep. 14, 2021

(65) Prior Publication Data

US 2021/0407185 A1 Dec. 30, 2021

Related U.S. Application Data

(63) Continuation of application No. PCT/US2020/028959, filed on Apr. 20, 2020.

(Continued)

(51) Int. Cl.
*G06F 3/04815* (2022.01)
*G06F 16/53* (2019.01)
(Continued)

(52) U.S. Cl.
CPC .......... *G06F 3/04815* (2013.01); *G06F 16/53* (2019.01); *G06K 7/1413* (2013.01);
(Continued)

(58) Field of Classification Search
CPC ...... G06F 3/04815; G06F 16/53; G06F 3/011; G06F 3/0304; G06K 7/1413; G06T 17/00;
(Continued)

(56) References Cited

U.S. PATENT DOCUMENTS

2005/0274804 A1* 12/2005 Matsumoto ...... G06K 19/06037
235/462.01
2009/0238625 A1* 9/2009 Ming .................. G07D 7/0043
400/76

(Continued)

OTHER PUBLICATIONS

PCT International Search Report and Written Opinion dated Jul. 17, 2020, International Application No. PCT/US2020/028959, pp. 1-10.

*Primary Examiner* — Jitesh Patel
(74) *Attorney, Agent, or Firm* — Fernando & Partners, LLP

(57) ABSTRACT

In some implementations, a method includes obtaining environmental data corresponding to a physical environment. In some implementations, the method includes determining, based on the environmental data, a bounding surface of the physical environment. In some implementations, the method includes detecting a physical element located within the physical environment based on the environmental data. In some implementations, the method includes determining a semantic label for the physical element based on at least a portion of the environmental data corresponding to the physical element. In some implementations, the method includes generating a semantic construction of the physical environment based on the environmental data. In some implementations, the semantic construction of the physical environment includes a representation of the bounding surface, a representation of the physical element and the semantic label for the physical element.

26 Claims, 12 Drawing Sheets

Related U.S. Application Data

(60) Provisional application No. 62/837,282, filed on Apr. 23, 2019.

(51) Int. Cl.
*G06T 17/00* (2006.01)
*G06V 10/764* (2022.01)
*G06V 10/82* (2022.01)
*G06V 20/70* (2022.01)
*G06V 20/20* (2022.01)
*G06V 10/22* (2022.01)
*G06K 7/14* (2006.01)

(52) U.S. Cl.
CPC ............ *G06T 17/00* (2013.01); *G06V 10/225* (2022.01); *G06V 10/764* (2022.01); *G06V 10/82* (2022.01); *G06V 20/20* (2022.01); *G06V 20/70* (2022.01); *G06T 2210/04* (2013.01)

(58) Field of Classification Search
CPC .............. G06T 2210/04; G06V 10/225; G06V 10/764; G06V 10/82; G06V 20/20; G06V 20/70
See application file for complete search history.

(56) References Cited

U.S. PATENT DOCUMENTS

| | | |
|---|---|---|
| 2012/0179651 A1 | 7/2012 | Marchese |
| 2017/0309079 A1 | 10/2017 | Naples et al. |
| 2018/0314888 A1* | 11/2018 | Koul ...................... G06V 20/20 |
| 2018/0365898 A1 | 12/2018 | Costa |
| 2019/0033958 A1* | 1/2019 | Hsiao ...................... G09B 5/02 |
| 2019/0287308 A1* | 9/2019 | Luo ...................... G06F 3/04815 |
| 2020/0089952 A1* | 3/2020 | Bastide ................ G06T 19/006 |

* cited by examiner

GENERATING A SEMANTIC CONSTRUCTION OF A PHYSICAL SETTING

CROSS-REFERENCE TO RELATED APPLICATION

This application is a continuation of Intl. Patent App. No. PCT/US2020/028959, filed on Apr. 20, 2020, which claims priority to U.S. Provisional Patent App. No. 62/837,282, filed on Apr. 23, 2019, which are both hereby incorporated by reference in their entirety.

TECHNICAL FIELD

The present disclosure generally relates to generating a semantic construction of a physical environment.

BACKGROUND

Some devices are capable of generating and presenting environments. Some devices that present environments include mobile communication devices such as smartphones. Most previously available devices that present an environment are ineffective at allowing a user to interact with the environment.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
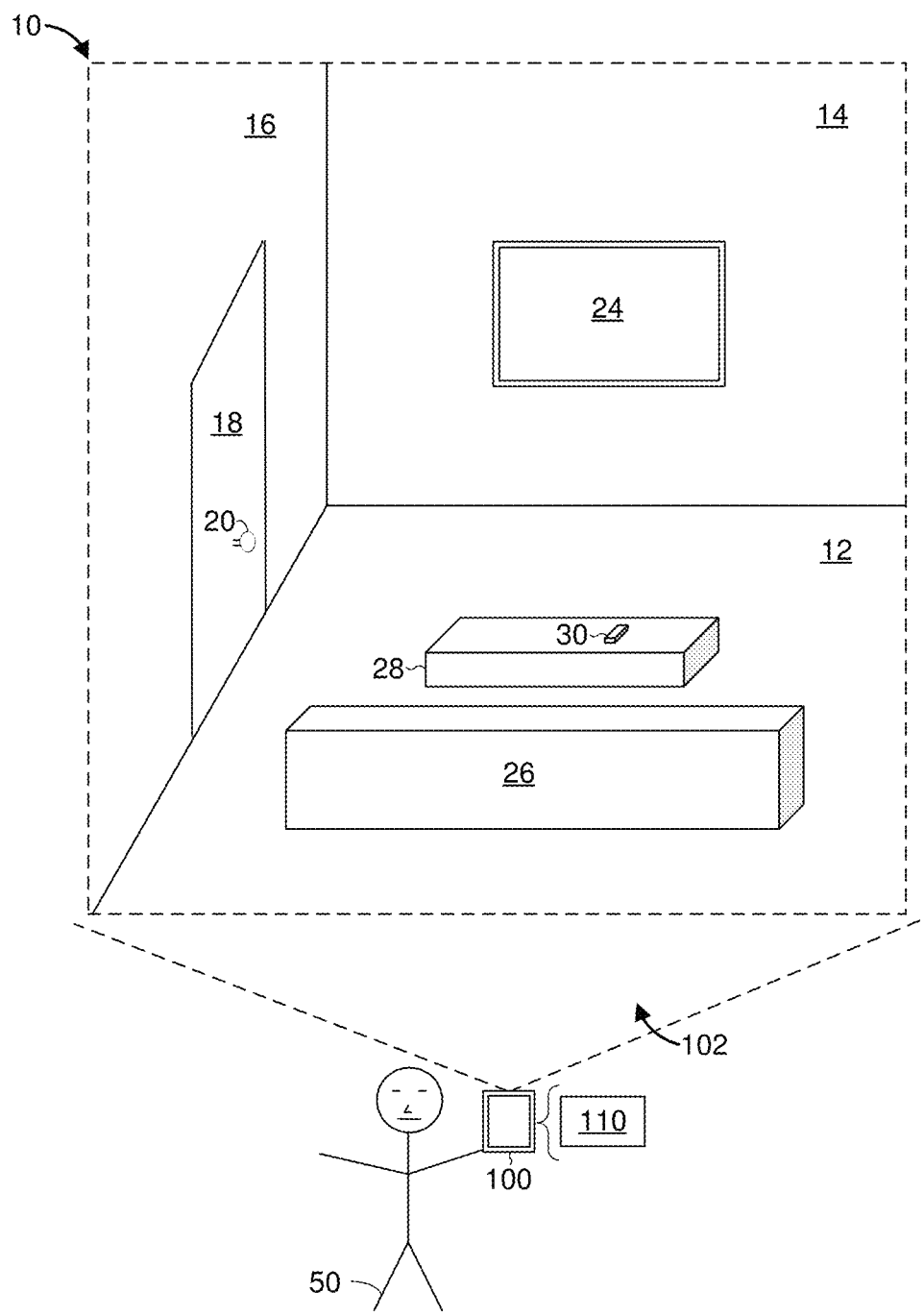
FIGS. 1A-1G are diagrams illustrating generation of a semantic construction of a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generating a semantic construction of a physical environment. In various implementations, a device includes a non-transitory memory and one or more processors coupled with the non-transitory memory. In some implementations, a method includes obtaining environmental data corresponding to a physical environment. In some implementations, the method includes determining, based on the environmental data, a bounding surface of the physical environment. In some implementations, the method includes detecting a physical element located within the physical environment based on the environmental data. In some implementations, the method includes determining a semantic label for the physical element based on at least a portion of the environmental data corresponding to the physical element. In some implementations, the method includes generating a semantic construction of the physical environment based on the environmental data. In some implementations, the semantic construction of the physical environment includes a representation of the bounding surface, a representation of the physical element and the semantic label for the physical element.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The present disclosure provides methods, systems, and/or devices for generating a semantic construction of a physical environment. The semantic construction of the physical environment can be utilized to generate and present an XR environment that corresponds to the physical environment. An XR representation of a person, an objective-effectuator and/or a virtual intelligent agent (VIA) instantiated in the XR environment can utilize the information included in the semantic construction to interact with an XR representation of a physical element (e.g., a real object). Hence, the semantic construction of the physical environment allows detection of and interaction with XR representations of physical elements.

FIG. 1A is a block diagram of an example operating environment 2 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 2 includes a physical environment 10, a user 50, and an electronic device 100.

In some implementations, the physical environment 10 include various physical elements (e.g., real objects). In the example of FIG. 1A, the physical environment 10 includes a floor 12, a front wall 14, a side wall 16, a door 18 with a door handle 20, a television 24, a couch 26, a coffee table 28, and a television remote 30. In some implementations, the user 50 is located within the physical environment 10.

In the example of FIG. 1A, the user 50 captures environmental data 110 corresponding to the physical environment 10 via the electronic device 100. For example, in some implementations, the electronic device 100 includes a camera (e.g., an outward-facing camera or a scene-facing camera). In such implementations, the electronic device 100 captures the environmental data 110 corresponding to the physical environment 10 when the physical environment 10 is in a field of view 102 of the camera. In some implementations, the environmental data 110 includes images and/or videos of the physical environment 10.

In some implementations, the electronic device 100 includes a depth sensor. In such implementations, the environmental data 110 include depth information corresponding to the physical environment 10. In some implementations, the environmental data 110 indicates relative positions of various physical elements within the physical environment 10. For example, the environmental data 110 indicates that the couch 26 is positioned 2 feet away from the coffee table 28. In some implementations, the environmental data 110 indicates dimensions of the physical environment 10 and/or the physical elements that are located within the physical environment 10.

In the example of FIG. 1A, the electronic device 100 is being held by the user 50. In some implementations, the electronic device 100 includes a smartphone, a tablet, a laptop, or the like. In some implementations, the electronic device 100 includes a wearable computing device that is worn by the user 50. For example, in some implementations, the electronic device 100 includes a head-mountable device (HMD). In some implementations, the HMD is shaped to form a receptacle that receives a device with a display (e.g., the device with the display can be slid into the HMD to serve as a display for the HMD). Alternatively, in some implementations, the HMD includes an integrated display.

In various implementations, the electronic device 100 determines a semantic label for each physical element in the physical environment 10. In some implementations, the semantic label for a physical element indicates a type of the physical element. In some implementations, the semantic label for a physical element includes a brief description of the physical element. In some implementations, the semantic label for a physical element indicates one or more properties of the physical element. In some implementations, the semantic label for a physical element indicates one or more physical properties of the physical element (e.g., hardness, texture, color, etc.). In some implementations, the semantic label for a physical element indicates an odor characteristic of the physical element.

Figure 1B:
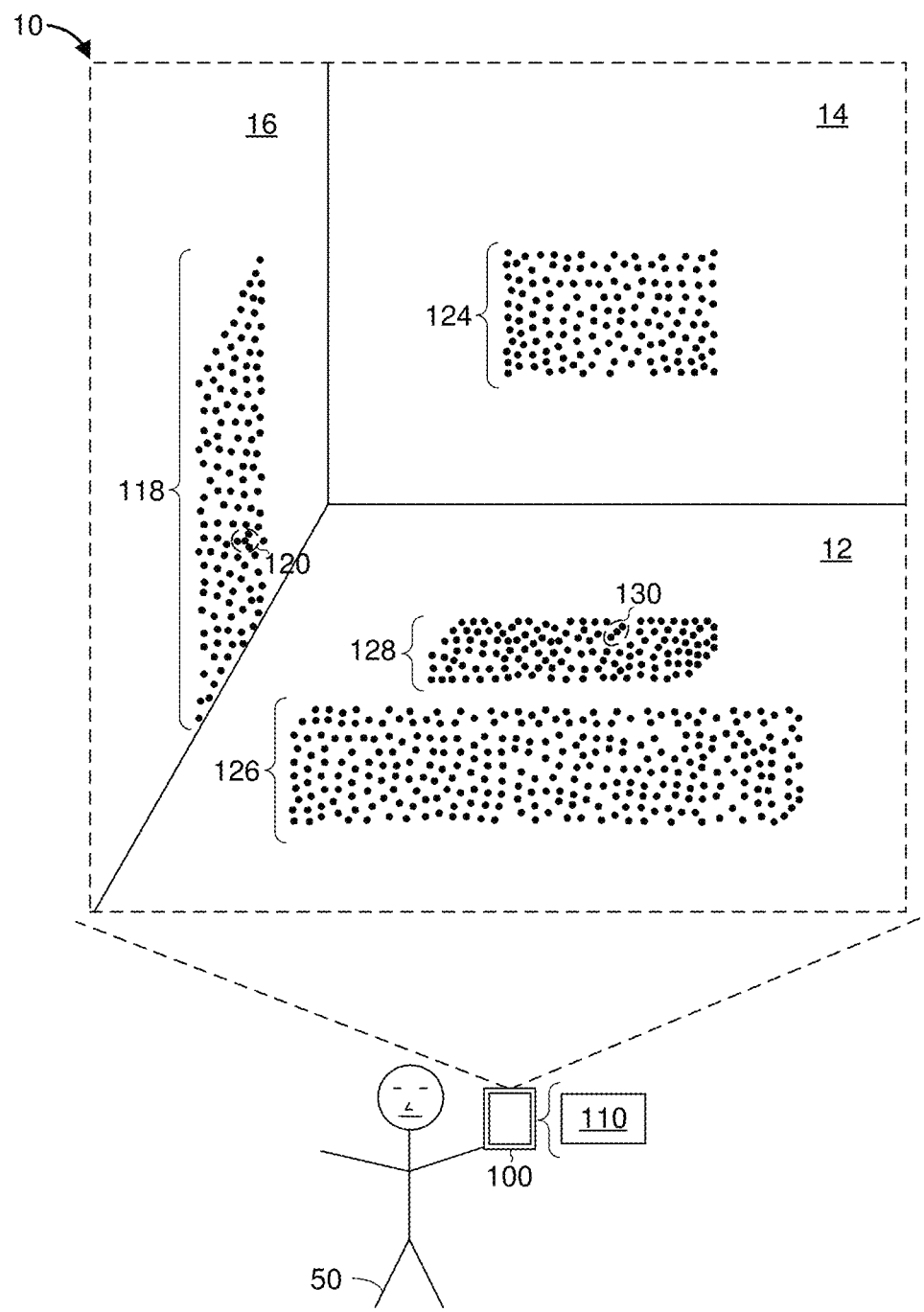
Figure 1C:
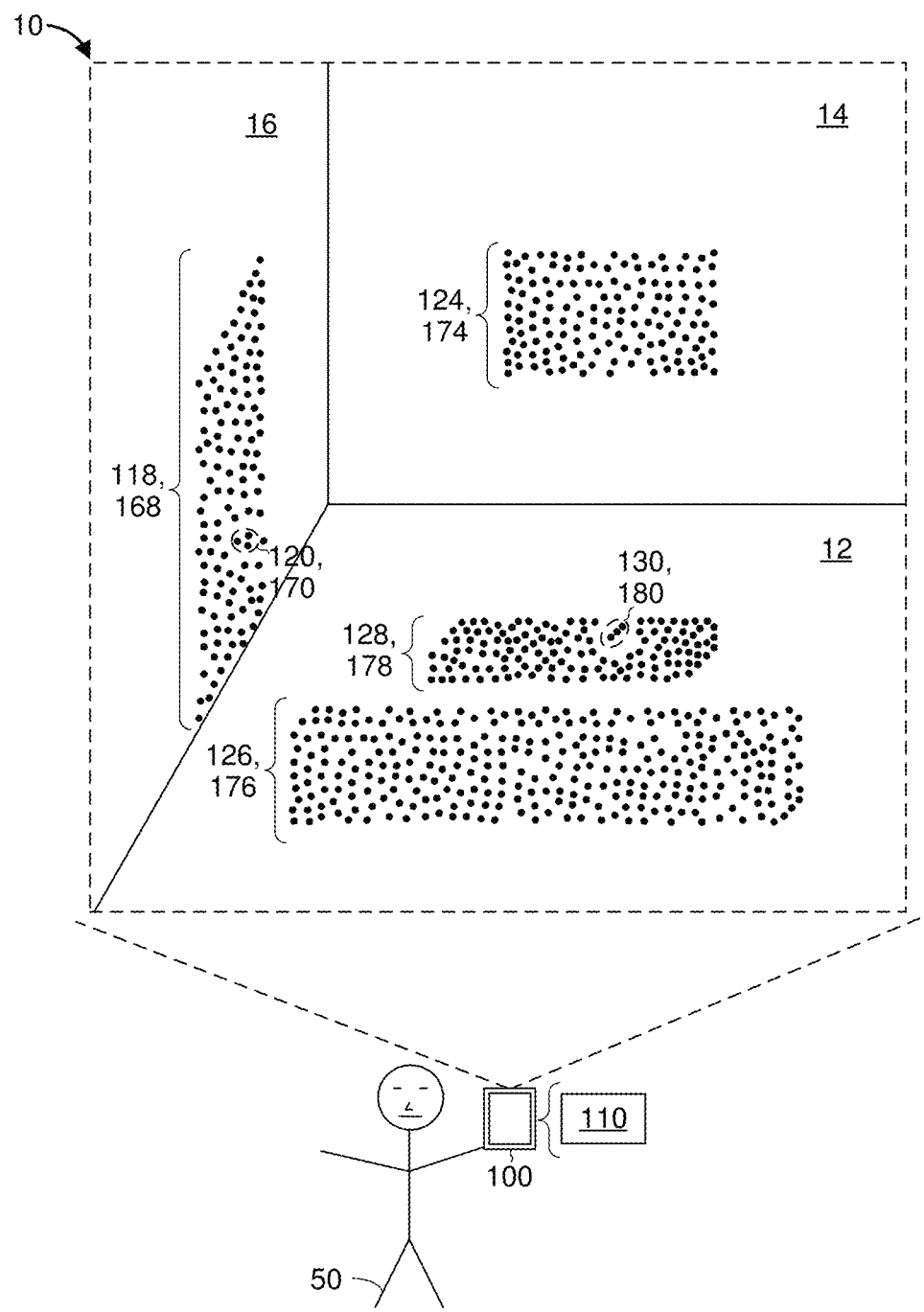

Referring to FIG. 1B, in some implementations, the electronic device 100 utilizes the environmental data 110 to generate three-dimensional (3D) point clouds ("point clouds", hereinafter for the sake of brevity) for the physical environment 10. As illustrated in FIGS. 1B and 1C, the electronic device 100 utilizes the point clouds to detect and semantically label the physical elements located within the physical environment 10. In some implementations, the electronic device 100 utilizes the point clouds to generate semantic labels for the physical elements located within the physical environment 10.

In various implementations, the environmental data 110 includes an image of the physical environment 10. In some implementations, the electronic device 100 utilizes methods, devices and/or systems associated with image processing to detect representations of physical elements and generate corresponding point clouds. In some implementations, the electronic device 100 utilizes feature detectors to detect representations of the physical elements and generate the corresponding point clouds. For example, the electronic device 100 utilizes edge detectors (e.g., Canny, Deriche, Differential, Sobel, Prewitt, or Roberts cross) to detect edges of physical elements (e.g., to detect edges of the coffee table 28). In some implementations, the electronic device 100 utilizes corner detectors (e.g., Harris operator, Shi and Tomasi, Level curve curvature, Hessian feature strength measures, SUSAN, and FAST) to detect corners of physical elements (e.g., to detect corners of the television 24).

In the example of FIG. 1B, the electronic device 100 generates a first point cloud 118 based on a portion of the environmental data 110 corresponding to the door 18. The electronic device 100 generates a second point cloud 120 based on a portion of the environmental data 110 corresponding to the door handle 20. The electronic device 100 generates a third point cloud 124 based on a portion of the environmental data 110 corresponding to the television 24. The electronic device 100 generates a fourth point cloud 126 based on a portion of the environmental data 110 corresponding to the couch 26. The electronic device 100 generates a fifth point cloud 128 based on a portion of the environmental data 110 corresponding to the coffee table 28. The electronic device 100 generates a sixth point cloud 130 based on a portion of the environmental data 110 corresponding to the television remote 30.

Referring to FIG. 1C, in some implementations, the electronic device 100 generates corresponding semantic labels for the point clouds. In the example of FIG. 1C, the electronic device 100 generates a first semantic label 168 for the first point cloud 118, a second semantic label 170 for the second point cloud 120, a third semantic label 174 for the third point cloud 124, a fourth semantic label 176 for the fourth point cloud 126, a fifth semantic label 178 for the fifth point cloud 128, and a sixth semantic label 180 for the sixth point cloud 130.

In some implementations, the semantic labels indicate types of physical elements that the corresponding point clouds represent. For example, the first semantic label 168 indicates that the first point cloud 118 corresponds to a door (e.g., the door 18). The second semantic label 170 indicates that the second point cloud 120 corresponds to a door handle (e.g., the door handle 20). The third semantic label 174 indicates that the third point cloud 124 corresponds to a display device (e.g., the television 24). The fourth semantic label 176 indicates that the fourth point cloud 126 corresponds to a seating space (e.g., the couch 26). The fifth semantic label 178 indicates that the fifth point cloud 128 corresponds to a table (e.g., the coffee table 28). The sixth semantic label 180 indicates that the sixth point cloud 150 corresponds to a remote control device (e.g., the television remote 30).

In some implementations, the semantic labels include brief descriptions of the physical elements that the corresponding point clouds represent. For example, the first semantic label 168 indicates that the first point cloud 118 corresponds to a physical element that allows entering into or exiting from a physical environment. The second semantic label 170 indicates that the second point cloud 120 corresponds to a physical element for opening/closing a door. The third semantic label 174 indicates that the third point cloud 124 corresponds to a physical element for viewing content. The fourth semantic label 176 indicates that the fourth point cloud 126 corresponds to a physical element for sitting or laying down. The fifth semantic label 178 indicates that the fifth point cloud 128 corresponds to a physical element for placing other physical elements. The sixth semantic label 180 indicates that the sixth point cloud 150 corresponds to a device for remotely controlling a display device.

In some implementations, the semantic labels indicate properties of physical elements that the corresponding point clouds represent. For example, in some implementations, the semantic labels indicate textures, hardness and/or colors of the physical elements that the point clouds represent. In some implementations, the electronic device 100 includes olfactory sensors that detect smells. In such implementations, the environmental data 110 includes smell data. In some such implementations, the semantic labels indicate odors of physical elements that the point clouds represent.

In various implementations, the electronic device 100 utilizes a neural network to generate the semantic labels for the point clouds. In some implementations, the electronic device 100 utilizes a long short-term memory (LSTM) recurrent neural network (RNN) to generate the semantic labels for the point clouds. In some implementations, the neural network receives the environmental data 110 and/or information corresponding to the point clouds as input, and outputs the semantic labels for the point clouds. In some implementations, the information corresponding to a point cloud includes a number of points in the point cloud, a density of the points in the point cloud, a shape of the point cloud, and/or a location of the point cloud relative to other point clouds.

In some implementations, the electronic device 100 includes a point labeler (e.g., a pixel labeler) that labels each point in a point cloud. In some implementations, the point labeler generates characterization vectors (e.g., point characterization vectors or pixel characterization vectors) for points in the point clouds. In some implementations, the electronic device 100 generates a semantic label for a point cloud in response to the points in the point cloud satisfying an object confidence threshold. In some implementations, the object confidence threshold is satisfied when a threshold number of characterization vectors include label values that are within a degree of similarity. For example, the object confidence threshold for the fifth point cloud 128 is satisfied when a threshold number (e.g., more than 75%) of the characterization vectors for the fifth point cloud 128 include a primary label indicative of a table (e.g., the coffee table 28).

In some implementations, generating the point clouds includes disambiguating the point clouds from each other. In some implementations, the electronic device 100 disambiguates the point clouds based on the characterization vectors of the points. For example, in some implementations, the electronic device 100 groups points that have characterization vectors with values that are within a degree of similarity.

Figure 1D:
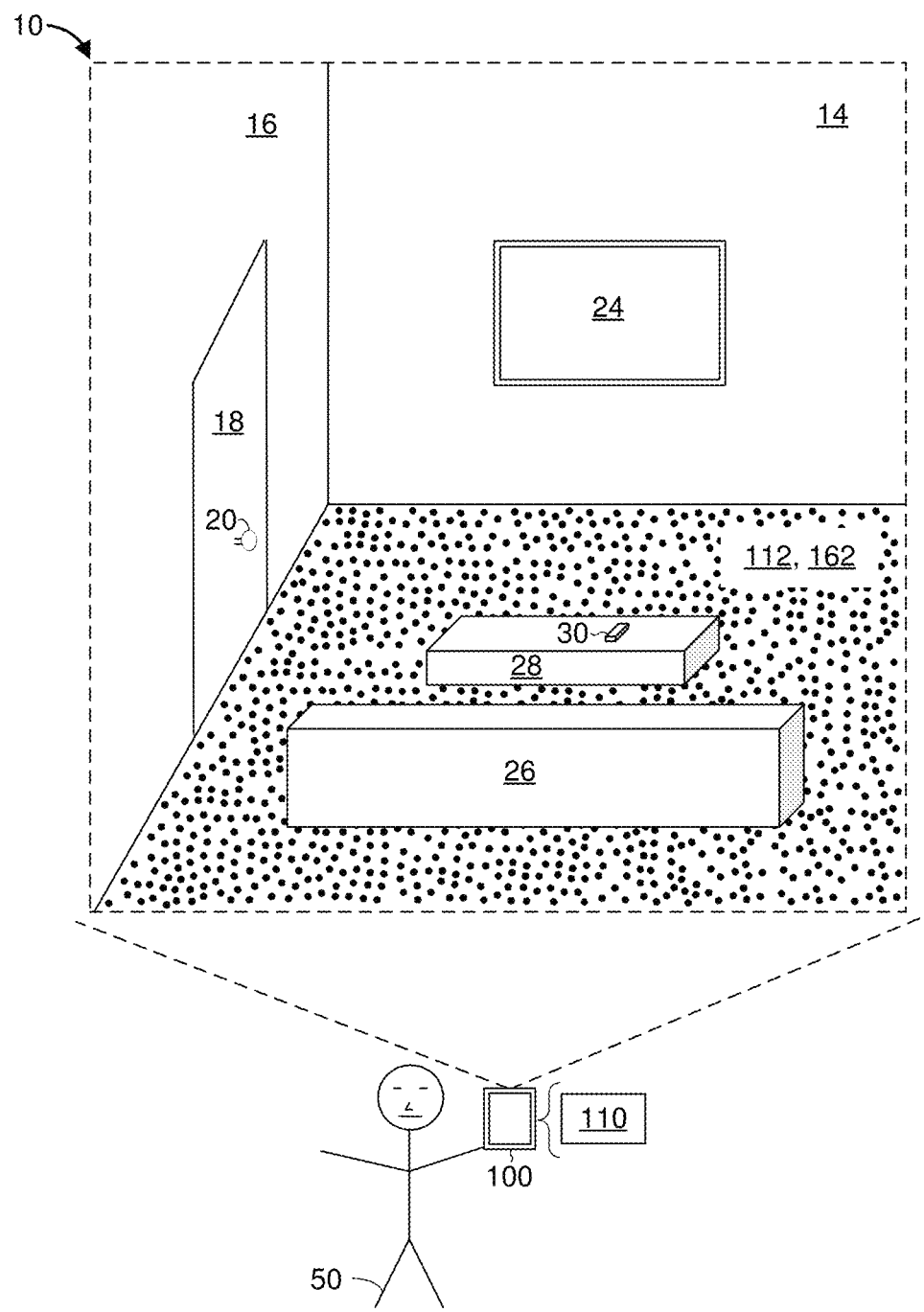

Referring to FIG. 1D, in some implementations, the electronic device 100 generates point clouds that correspond to bounding surfaces of the physical environment 10. For example, as shown in FIG. 1D, the electronic device 100 generates a seventh point cloud 112 that corresponds to the floor 12 of the physical environment 10. In the example of FIG. 1D, the electronic device 100 generates a seventh semantic label 162 for the seventh point cloud 112. For example, the seventh semantic label 162 indicates that the seventh point cloud 112 corresponds to a floor (e.g., the floor 12) of the physical environment 10.

Figure 1E:
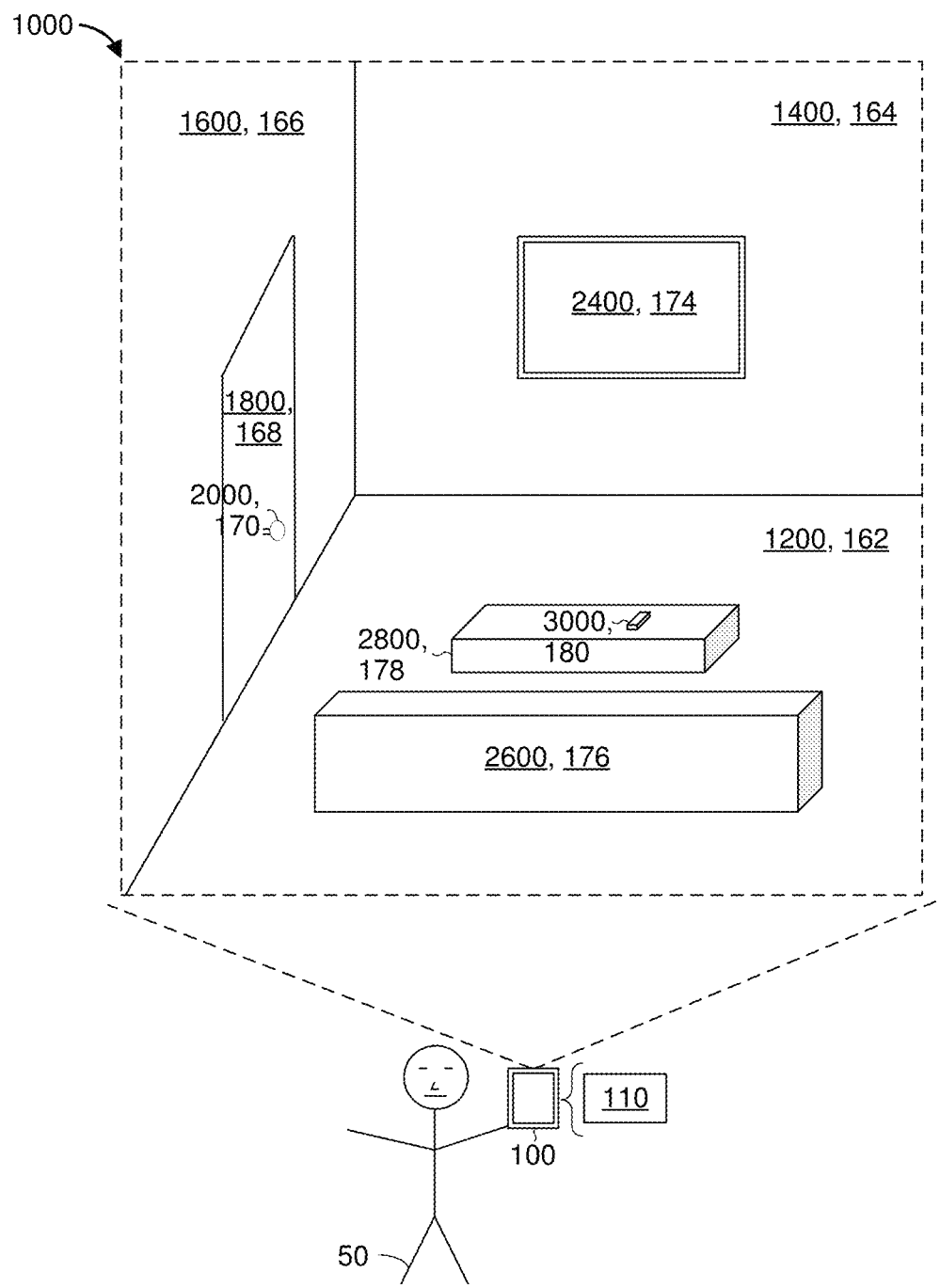

As shown in FIG. 1E, in some implementations, the electronic device 100 generates a semantic construction 1000 of the physical environment 10 based on the environmental data 110. In various implementations, the semantic construction 1000 includes a representation of a bounding surface of the physical environment. For example, the semantic construction 1000 includes a representation 1200 of the floor 12, a representation 1400 of the front wall 14, and a representation 1600 of the side wall 16. In some implementations, the semantic construction 1000 includes semantic labels that are associated with the representations of the bounding surfaces. For example, in the semantic construction 1000, the seventh semantic label 162 is associated with the representation 1200 of the floor 12. In some implementations, the seventh semantic label 162 indicates properties that are associated with the representation 1200 of the floor 12 (e.g., the seventh semantic label 162 indicates that the floor 12 is made from ceramic tiles).

In the example of FIG. 1E, the semantic construction 1000 includes an eighth semantic label 164 that is associated with the representation 1400 of the front wall 14, and a ninth semantic label 166 that is associated with the representation 1600 of the side wall 16. In some implementations, the eighth semantic label 164 indicates properties that are associated with the representation 1400 of the front wall 14 (e.g., the eighth semantic label 164 indicates a paint texture and/or a paint color of the front wall 14). In some implementations, the ninth semantic label 166 indicates properties that are associated with the representation 1600 of the side wall 16 (e.g., the ninth semantic label 166 indicates a reflectiveness of the side wall 16).

In various implementations, the semantic construction 1000 includes representations of physical elements that are located in the physical environment 10. For example, the semantic construction 1000 includes a door representation 1800 that represents the door 18 in the physical environment 10. The semantic construction 1000 includes a door handle representation 2000 that represents the door handle 20 in the physical environment 10. The semantic construction 1000 includes a television representation 2400 that represents the television 24 in the physical environment 10. The semantic construction 1000 includes a couch representation 2600 that represents the couch 26 in the physical environment 10. The semantic construction 1000 includes a coffee table representation 2800 that represents the coffee table 28 in the physical environment 10. The semantic construction 1000 includes a television remote representation 3000 that represents the television remote 30 in the physical environment 10.

In various implementations, the semantic construction 1000 includes semantic labels for the physical elements that are located in the physical environment 10. For example, the semantic construction 1000 includes the first semantic label 168 in association with the door representation 1800. In some examples, the first semantic label 168 indicates a color and/or a material for the door representation 1800. In the example of FIG. 1E, the semantic construction 1000 includes the second semantic label 170 in association with the door handle representation 2000. In some examples, the second semantic label 170 indicates a color, a shape, a size and/or a material for the door handle representation 2000.

In the example of FIG. 1E, the semantic construction 1000 includes the third semantic label 174 in association with the television representation 2400. In some examples, the third semantic label 174 indicates a size and/or a thickness for the television representation 2400. In the example of FIG. 1E, the semantic construction 1000 includes the fourth semantic label 176 in association with the couch representation 2600. In some examples, the fourth semantic label 176 indicates a length, a number of seats, a color, a shape and/or a material for the couch representation 2600.

In the example of FIG. 1E, the semantic construction 1000 includes the fifth semantic label 178 in association with the coffee table representation 2800. In some examples, the fifth semantic label 178 indicates a height and/or a surface material for the coffee table representation 2800. In the example of FIG. 1E, the semantic construction 1000 includes the sixth semantic label 180 in association with the television remote representation 3000. In some examples, the sixth semantic label 180 indicates a number of buttons, a size of the buttons and/or a positioning of the buttons for the television remote representation 3000.

Figure 1F:
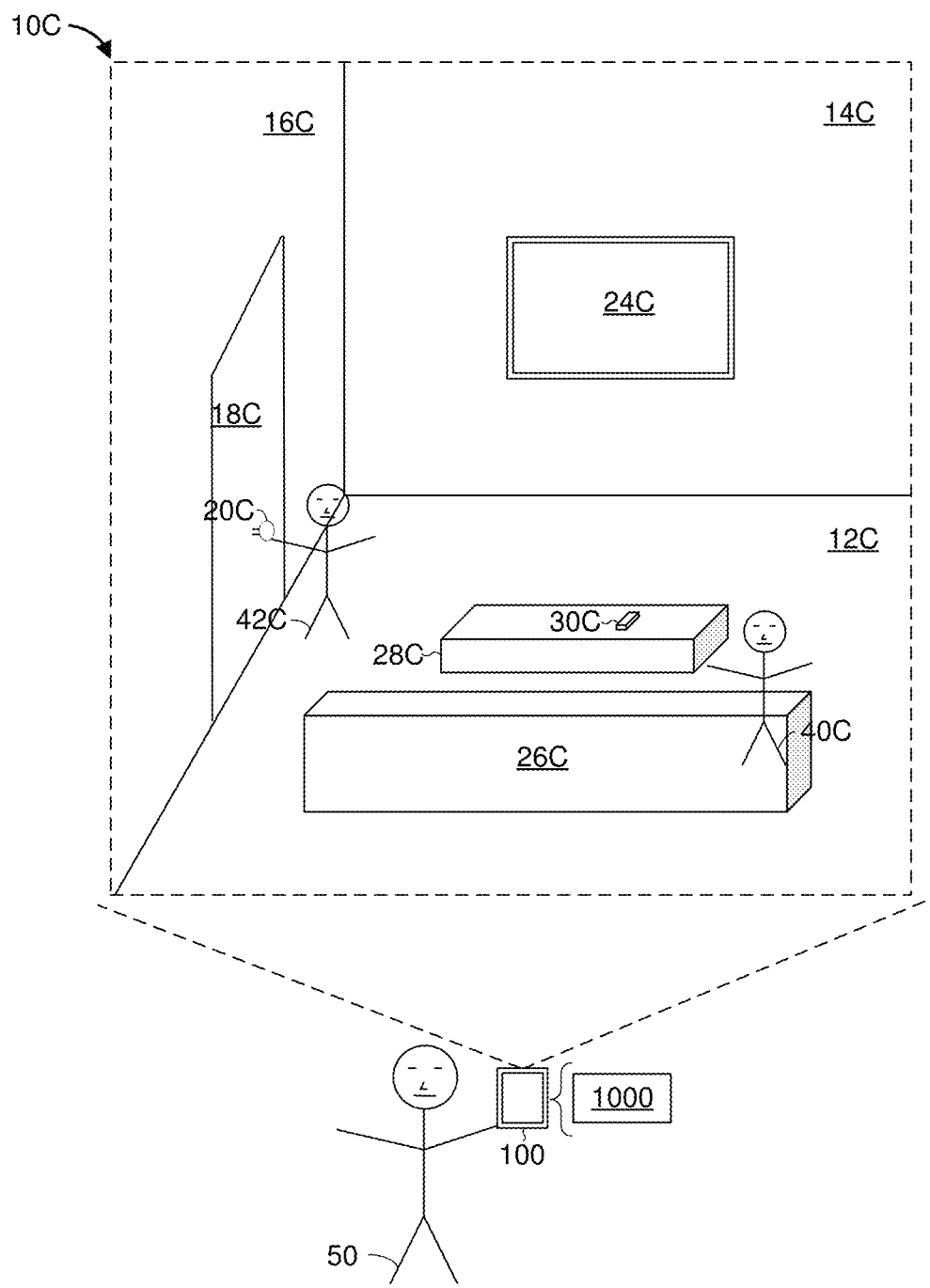

Referring to FIG. 1F, in various implementations, the electronic device 100 generates an extended reality (XR) environment 10C based on the semantic construction 1000 of the physical environment 10. In various implementations, the XR environment 10C includes XR representations of physical elements that are located in the physical environment 10. The electronic device 100 generates the XR representations based on the semantic labels included in the semantic construction 1000 of the physical environment 10. As such, the XR representations of physical elements and bounding surfaces are within a degree of similarity to the physical elements and the bounding surfaces, respectively. Moreover, the XR representations of the physical elements are operable within a degree of similarity to the physical elements in the physical environment 10.

In the example of FIG. 1F, the XR environment 10C includes an XR floor 12C that represents the floor 12 of the physical environment 10, an XR front wall 14C that represents the front wall 14, an XR side wall 16C that represents the side wall 16, an XR door 18C that represents the door 18, an XR door handle 20C that represents the door handle 20, an XR television 24C that represents the television 24, an XR couch 26C that represents the couch 26, an XR coffee table 28C that represents the coffee table 28, and an XR television remote 30C that represents the television remote 30.

In the example of FIG. 1F, the XR environment 10C includes a first XR person 40C and a second XR person 42C. In some implementations, the first XR person 40C and/or the second XR person 42C are XR representations of persons in a physical environment. In some implementations, the first XR person 40C and/or the second XR person 42C are XR representations of fictional persons from fictional materials (e.g., movies, books, games, etc.). In some implementations, the first XR person 40C and/or the second XR person 42C are XR representations of virtual intelligent agents (VIAs) and/or objective-effectuators.

In various implementations, the first XR person 40C and/or the second XR person 42C perform actions within the XR environment 10C that include detecting and/or interacting with various XR objects in the XR environment 10C. In the example of FIG. 1F, the second XR person 42C manipulates the XR door handle 20C to open/close the XR door 18C. In the example of FIG. 1F, the first XR person 40C sits on the XR couch 26C. The first XR person 40C and/or the second XR person 42C are able to detect and/or interact with the various XR objects in the XR environment 10C because the XR objects are associated with the same properties as the corresponding physical elements. The XR objects are associated with the same properties as the corresponding physical elements because the electronic device 100 utilized the semantic labels in the semantic construction 1000 to generate the XR environment 10C.

Figure 1G:
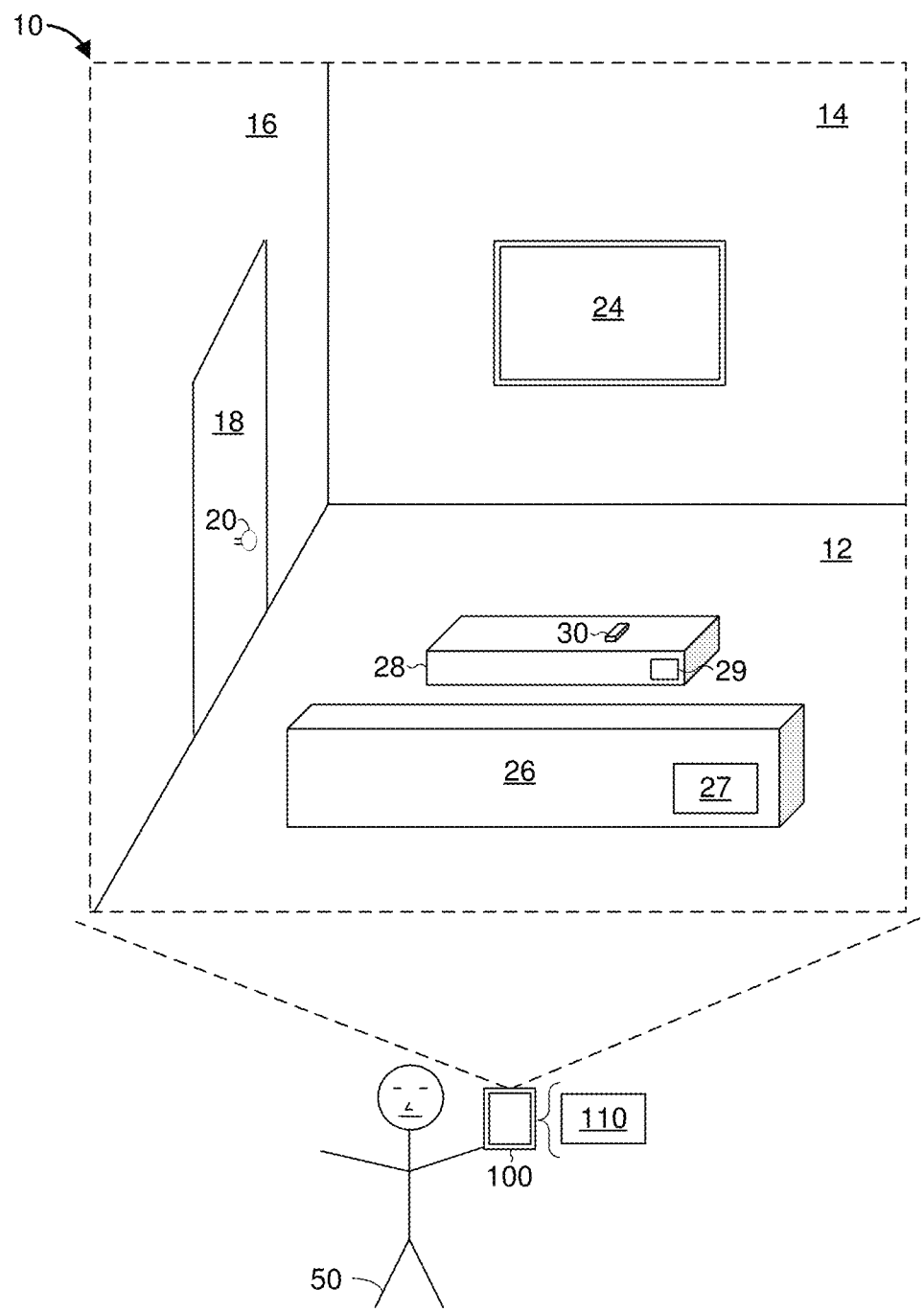

Referring to FIG. 1G, in some implementations, some physical elements in the physical environment 10 are associated with an optical machine-readable representation of data. In some implementations, the optical machine-readable representation of data includes a barcode. In some implementations, the barcode includes a one-dimensional (1D) barcode. In some implementations, the barcode includes a two-dimensional (2D) barcode (e.g., a QR code). As shown in FIG. 1G, a first barcode 27 is affixed to the couch 26 and a second barcode 29 is affixed to the coffee table 28. The first barcode 27 includes identifying information for the couch 26 (e.g., a model number, a manufacturer, a size and/or a color of the couch 26). Similarly, the second barcode 29 includes identifying information for the coffee table 28 (e.g., a material, a color, dimensions, a manufacturer of the coffee table 28). In some implementations, the barcodes are attached to the physical elements by manufacturers and/or retailers of the physical elements (e.g., the first barcode 27 is attached to the couch 26 by the manufacturer of the couch 26 or a retailer of the couch 26).

In the example of FIG. 1G, the electronic device 100 generates a semantic label for the couch 26 (e.g., the fourth semantic label 176 shown in FIG. 1C) based on the first barcode 27. As such, the electronic device 100 forgoes disambiguating the fourth point cloud 126 and generating the fourth semantic label 176 based on the fourth point cloud 126. In some implementations, generating semantic labels based on barcodes is less resource-intensive than generating semantic labels based on point clouds. As such, generating the semantic label for the couch 26 based on the first barcode 27 reduces an amount of computing resources and/or an amount of time required to generate the semantic label. In some implementations, the electronic device 100 generates a semantic label (e.g., the fifth semantic label 178 shown in FIG. 1C) for the coffee table 28 based on the second barcode 29.

In some implementations, a head-mountable device (HMD) (not shown), being worn by the user 50, presents (e.g., displays) the XR environment 10C according to various implementations. In some implementations, the HMD includes an integrated display (e.g., a built-in display) that displays the XR environment 10C. In some implementations, the HMD includes a head-mountable enclosure. In various implementations, the head-mountable enclosure includes an attachment region to which another device with a display can be attached. For example, in some implementations, the electronic device 100 can be attached to the head-mountable enclosure. In various implementations, the head-mountable enclosure is shaped to form a receptacle for receiving another device that includes a display (e.g., the electronic device 100). For example, in some implementations, the electronic device 100 slides/snaps into or otherwise attaches to the head-mountable enclosure. In some implementations, the display of the device attached to the head-mountable enclosure presents (e.g., displays) the XR environment 10C.

Figure 2:
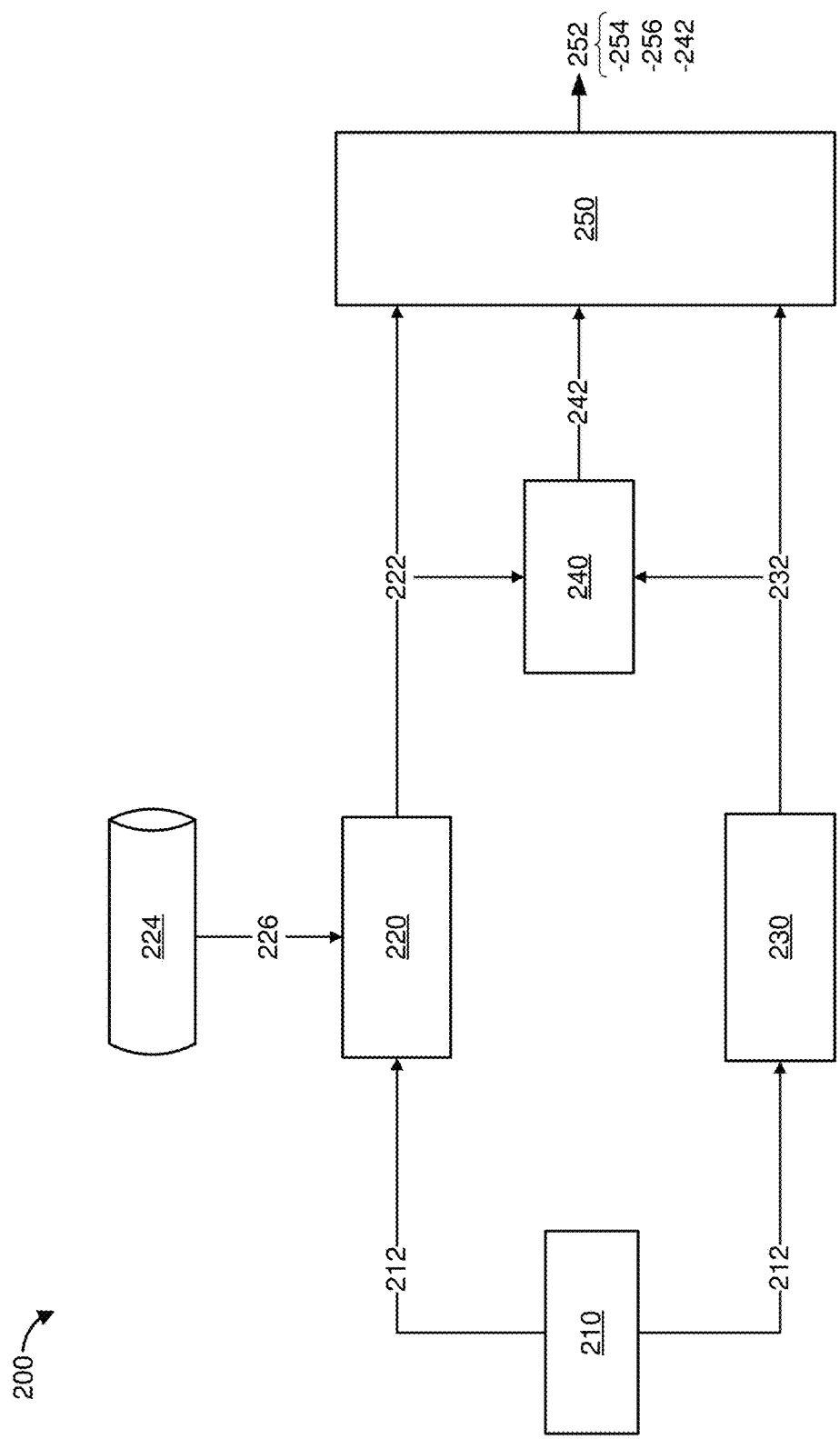
FIG. 2 is a block diagram of an example device in accordance with some implementations.

FIG. 2 illustrates a block diagram of a device 200. In some implementations, the device 200 implements the electronic device 100 shown in FIGS. 1A-1G. In various implementations, the device 200 generates a semantic construction 252 of a physical environment (e.g., the semantic construction 1000 of the physical environment 10). As illustrated in FIG. 2, in some implementations, the device 200 includes a data obtainer 210, a bounding surface determiner 220, a physical element detector 230, a semantic label determiner 240, and a semantic construction generator 250.

In various implementations, the data obtainer 210 obtains environmental data 212 corresponding to a physical environment (e.g., the environmental data 110 shown in FIGS. 1A-1E). In some implementations, the data obtainer 210 obtains the environmental data 212 from a camera in the form of an image and/or a video. In some implementations, the data obtainer 210 obtains the environmental data 212 from a depth sensor in the form of depth data. In some implementations, the data obtainer 210 obtains the environmental data 212 by scanning an optical machine-readable representation of data (e.g., a barcode, for example, the first barcode 27 for the couch 26 and/or the second barcode 29 for the coffee table 28 shown in FIG. 1G).

In various implementations, the bounding surface determiner 220 determines one or more bounding surfaces of the physical environment based on the environmental data 212. In some implementations, the bounding surface determiner 220 identifies physical surfaces in the physical environment (e.g., a floor, walls and/or a ceiling). In some implementations, the bounding surface determiner 220 identifies a boundary associated with the physical environment. In some implementations, the bounding surface determiner 220 obtains boundary information 226 from a boundary datastore 224. In some implementations, the boundary information 226 indicates plot lines for a parcel of land. In such implementations, the bounding surface determiner 220 determines a bounding surface that runs along the plot line indicated by the boundary information 226. In some implementations, the bounding surface determiner 220 utilizes point clouds to determine the bounding surfaces (e.g., utilizing the seventh point cloud 112 shown in FIG. 1D to determine the floor 12 of the physical environment 10). The bounding surface determiner 220 generates bounding surface information 222 and sends the bounding surface information 222 to the semantic label determiner 240.

In various implementations, the physical element detector 230 detects physical elements located within the physical environment based on the environmental data 212. In some implementations, the physical element detector 230 utilizes point clouds to detect the physical elements in the physical environment (e.g., utilizing the first point cloud 118 shown in FIG. 1C to detect the door 18 in the physical environment 10). The physical element detector 230 generates physical element information 232 and sends the physical element information 232 to the semantic label determiner 240.

In some implementations, the physical element detector 230 performs instance segmentation on the environmental data 212 to detect the physical elements located within the physical environment. To that end, in some implementations, the physical element detector 230 includes an instance segmentor that performs the instance segmentation on the environmental data 212 and generates the physical element information 232.

In various implementations, the bounding surface determiner 220 and/or the physical element detector 230 utilize a neural network to determine the bounding surface(s) and/or detect the physical elements, respectively. In some implementations, the neural network receives the environmental data 212 and/or the point clouds as input(s) and outputs the bounding surface information 222 and/or the physical element information 232.

In various implementations, the semantic label determiner 240 determines semantic labels 242 for the physical elements and/or the bounding surfaces located in the physical environment. In some implementations, the semantic label determiner 240 determines the semantic labels 242 based on the bounding surface information 222 and/or the physical element information 232 generated by the bounding surface determiner 220 and/or the physical element detector 230, respectively.

In some implementations, the semantic label determiner 240 performs semantic segmentation on the environmental data 212 in order to determine the semantic labels 242. To that end, in some implementations, the semantic label determiner 240 includes a semantic segmentor that performs the semantic segmentation on the environmental data 212 and generates the semantic labels 242 based on the semantic segmentation.

In some implementations, the semantic label determiner 240 includes a neural network that obtains the bounding surface information 222 and/or the physical element information 232 as input(s), and outputs the semantic labels 242 for the bounding surface(s) and/or the physical elements located in the physical environment.

In various implementations, the semantic construction generator 250 generates the semantic construction 252 of the physical environment based on the bounding surface information 222, the physical element information 232 and/or the semantic labels 242. In some implementations, the semantic construction 252 includes bounding surface representations 254 (e.g., the representation 1200 of the floor 12 shown in FIG. 1E), physical element representations 256 (e.g., the couch representation 2600 and the coffee table representation 2800 shown in FIG. 1E), and the semantic labels 242 (e.g., the fourth semantic label 176 associated with the couch representation 2600, and the fifth semantic label 178 associated with the coffee table representation 2800).

Figure 3A:
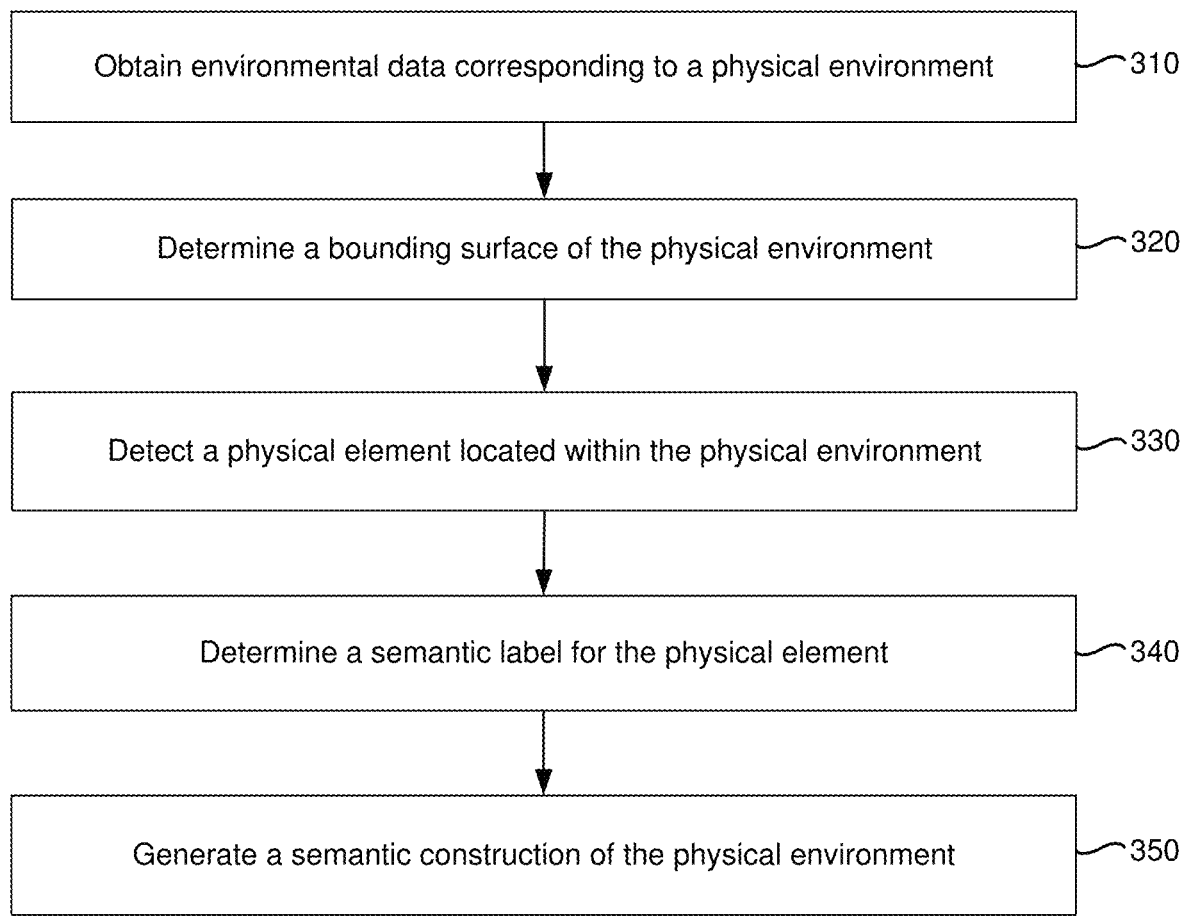
FIGS. 3A-3C are flowchart representations of a method of generating a semantic construction of a physical environment in accordance with some implementations.

FIG. 3A is a flowchart representation of a method 300 of generating a semantic construction of a physical environment. In various implementations, the method 300 is performed by a device with a non-transitory memory and one or more processors coupled with the non-transitory memory (e.g., the electronic device 100 shown in FIGS. 1A-1G and/or the device 200 shown in FIG. 2). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in some implementations, the method 300 includes obtaining environmental data corresponding to a physical environment. For example, the method 300 includes obtaining the environmental data 110 shown in FIGS. 1A-1E, and/or the environmental data 212 shown in FIG. 2. In some implementations, the method 300 includes receiving the environmental data at the device. In some implementations, the method 300 includes retrieving the environmental data from a non-transitory memory. In some implementations, the method 300 includes detecting the environmental data.

As represented by block 320, in some implementations, the method 300 includes determining, based on the environmental data, a bounding surface of the physical environment. In some implementations, the method 300 includes determining a physical surface (e.g., a real surface) of the physical environment. For example, in some implementations, the method 300 includes determining a floor (e.g., the floor 12 shown in FIG. 1A), a ceiling and/or walls of the physical environment (e.g., the front wall 14 and/or the side wall 16 shown in FIG. 1A).

As represented by block 330, in some implementations, the method 300 includes detecting a physical element located within the physical environment based on the environmental data. In some implementations, the method 300 includes identifying the real objects located at the physical environment based on the environmental data. For example, the electronic device 100 detects the television 24, the couch 26, the coffee table 28 and the television remote 30 located at the physical environment 10 shown in FIG. 1A.

As represented by block 340, in some implementations, the method 300 includes determining a semantic label for the physical element based on at least a portion of the environmental data corresponding to the physical element. For example, the electronic device 100 determines the first semantic label 168, the second semantic label 170, etc. shown in FIG. 1C. In some implementations, the method 300 includes generating the semantic label to indicate a type of the physical element.

As represented by block 350, in some implementations, the method 300 includes generating a semantic construction of the physical environment based on the environmental data. For example, as shown in FIG. 1E, the electronic device 100 generates the semantic construction 1000 based on the environmental data 110. In some implementations, the semantic construction includes a representation of the bounding surface. For example, as shown in FIG. 1E, the semantic construction 1000 includes a representation 1200 of the floor 12. In some implementations, the semantic construction includes a representation of the physical element. For example, as shown in FIG. 1E, the semantic construction 1000 includes a television representation 2400 for the television 24. In some implementations, the semantic construction includes the semantic label for the physical element. For example, as shown in FIG. 1E, the semantic construction 1000 includes the fourth semantic label 176 in association with the couch representation 2600.

Figure 3B:
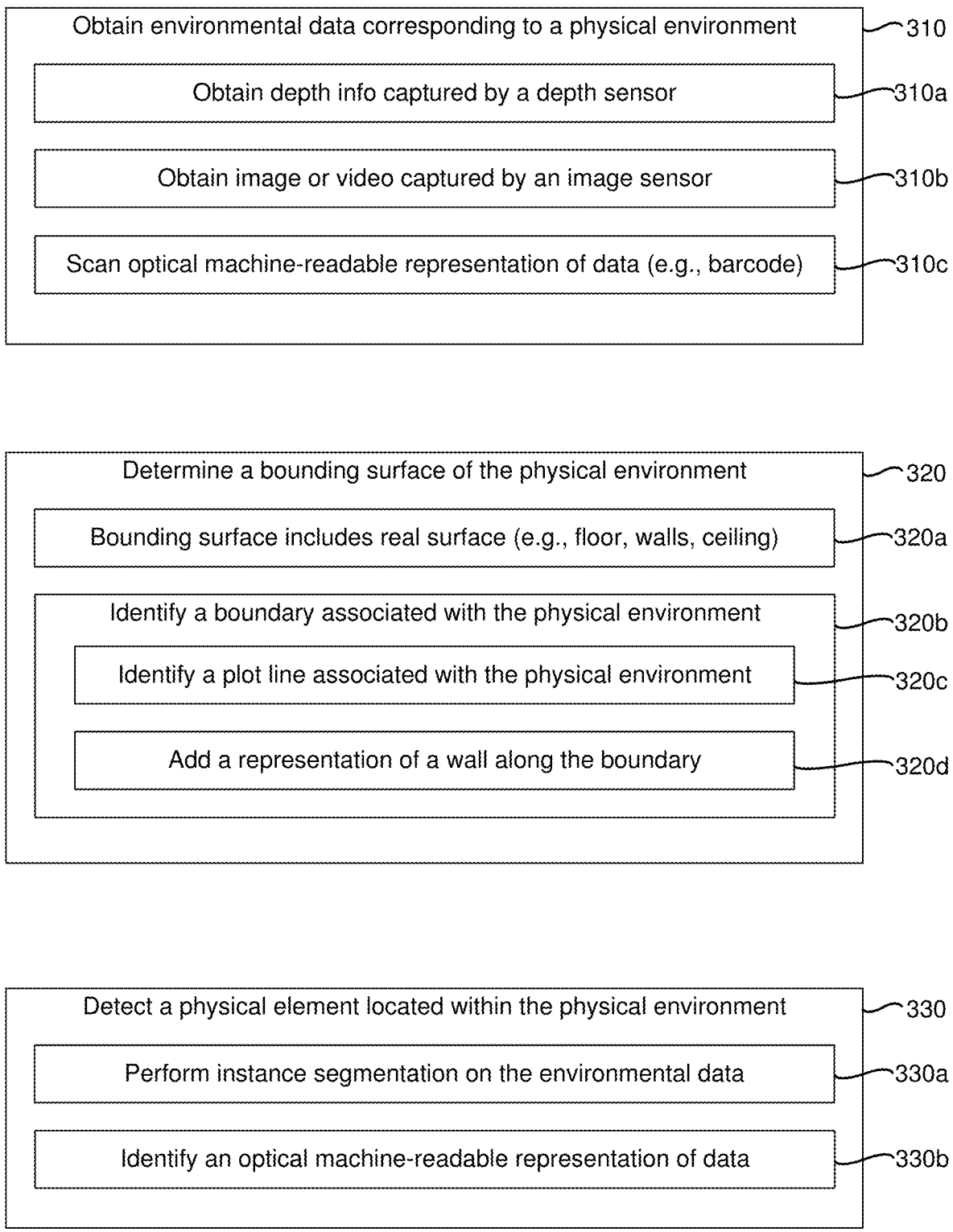

Referring to FIG. 3B, as represented by block 310a, in some implementations, the method 300 includes obtaining depth information captured by a depth sensor. For example, in some implementations, the electronic device 100 shown in FIG. 1A includes a depth sensor, and the environmental data 110 includes depth information.

As represented by block 310b, in some implementations, the method 300 includes obtaining an image or a video captured by an image sensor (e.g., a camera). For example, in some implementations, the electronic device 100 shown in FIG. 1A includes an image sensor, and the environmental data 110 includes an image or a video of the physical environment 10.

As represented by block 310c, in some implementations, the method 300 includes scanning an optical machine-readable representation of data (e.g., a barcode). For example, as shown in FIG. 1G, the electronic device 100 scans the first barcode 27 for the couch 26 and the second barcode 29 for the coffee table 28.

As represented by block 320a, in some implementations, the method 300 includes detecting a physical surface in the physical environment. In some implementations, the method 300 includes detecting a floor, a wall and/or a ceiling of the physical environment. For example, as shown in FIG. 1D, the electronic device 100 detects the floor 12 of the physical environment 10.

As represented by block 320b, in some implementations, the method 300 includes identifying a boundary associated with the physical environment and representing the boundary with a representation of a surface in the semantic construction of the physical environment. As represented by block 320c, in some implementations, the method 300 includes identifying a plot line associated with the physical environment based on information stored in a datastore. For example, as shown in FIG. 2, the bounding surface determiner 220 obtains boundary information 226 (e.g., a location of a plot line) from the boundary datastore 224 (e.g., county property records). As represented by block 320d, in some implementations, the method 300 includes adding a representation of a wall in the semantic construction along the boundary.

As represented by block 330a, in some implementations, the method 300 includes performing instance segmentation on the environmental data in order to detect the physical element. For example, the physical element detector 230 shown in FIG. 2 performs instance segmentation on the environmental data 212 in order to generate the physical element information 232.

As represented by block 330b, in some implementations, the method 300 includes identifying an optical machine-readable representation of data associated with the physical element. For example, as shown in FIG. 1G, the electronic device 100 identifies the first barcode 27 attached to the couch 26, and the second barcode 29 attached to the coffee table 28.

Figure 3C:
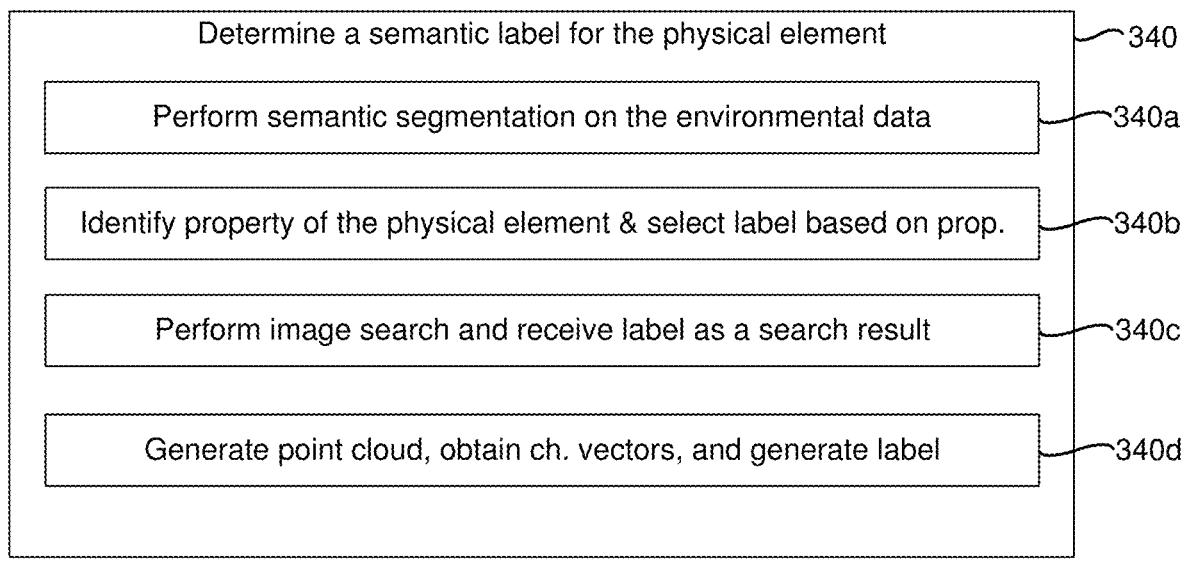
Figure 3C:
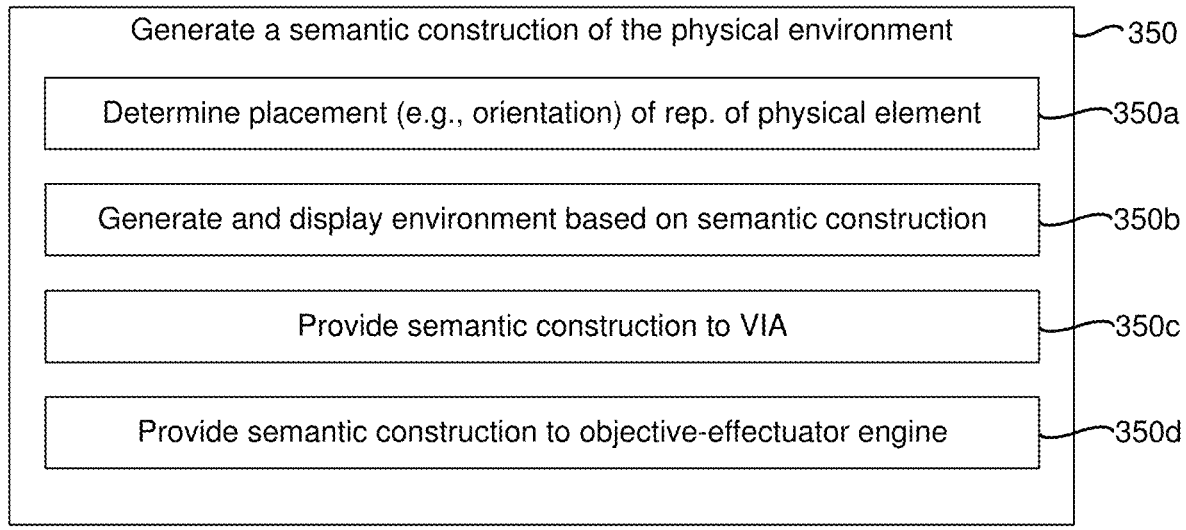

Referring to FIG. 3C, as represented by block 340a, in some implementations, the method 300 includes performing semantic segmentation on at least a portion of the environmental data corresponding to the physical element in order to determine the semantic label for the physical element. For example, the semantic label determiner 240 performs semantic segmentation on the environmental data 212 in order to generate the semantic labels 242.

As represented by block 340b, in some implementations, the method 300 includes identifying one or more properties associated with the physical element, and selecting the semantic label based on the one or more properties associated with the physical element. For example, identifying that the physical element has a surface and four rods extending from the surface, hence, the physical element is a table.

As represented by block 340c, in some implementations, the method 300 includes performing an image search based on a portion of the environmental data corresponding to the physical element, and receiving the semantic label as a search result. For example, the method 300 includes performing an image search on a portion of the environmental data 110 corresponding to the first point cloud 118, and receiving a search result indicating that the portion of the environmental data 110 corresponding to the first point cloud 118 represents a door (e.g., the door 18).

As represented by block 340d, in some implementations, the method 300 includes generating a point cloud that includes a plurality of points, obtaining respective characterization vectors for the plurality of points, and generating the semantic label for the point cloud in response to the plurality of points satisfying an object confidence threshold. In some implementations, the plurality of points satisfy the object confidence threshold when a threshold number of characterization vectors include label values that are within a degree of similarity. For example, as shown in FIG. 1C, the electronic device 100 generates the point clouds 118, 120, 124, 126, 128 and 130, and selects corresponding semantic labels 168, 170, 174, 176, 178 and 180.

As represented by block 350a, in some implementations, the method 300 includes determining a placement of the representation of the physical element in relation to the representation of the bounding surface. For example, the electronic device 100 determines the placement of the couch representation 2600 on top of the representation 1200 of the floor within the semantic construction 1000 shown in FIG. 1E. In some implementations, the method 300 includes determining an orientation of the representation of the physical element within the semantic construction. For example, the electronic device 100 determines that the couch representation 2600 faces the television representation 2400 within the semantic construction 1000 shown in FIG. 1E.

As represented by block 350b, in some implementations, the method 300 includes generating, based on the semantic construction of the physical environment, an XR environment that corresponds to the physical environment. For example, the electronic device 100 generates and displays the XR environment 10C shown in FIG. 1F. In some implementations, the XR environment includes an XR object that represents the physical element. For example, the XR environment 10C includes an XR couch 26C that is an XR representation of the couch 26 in the physical environment 10.

As represented by block 350c, in some implementations, the method 300 includes providing the semantic construction of the physical environment to a virtual intelligent agent (VIA) that generates actions for an XR object that represents the VIA. For example, in some implementations, the first XR person 40C shown in FIG. 1F is controlled by the VIA (e.g., the first XR person 40C represents the VIA). In such implementations, the VIA generates actions for the first XR person 40C that include detecting and interacting with XR representations of physical elements (e.g., the first XR person 40C is sitting on the XR couch 26C).

As represented by block 350d, in some implementations, the method 300 includes providing the semantic construction of the physical environment to an objective-effectuator engine that generates actions for an XR object representing an objective-effectuator that is instantiated in the XR environment. For example, in some implementations, the second XR person 42C is an XR representation of the objective-effectuator. In such implementations, the objective-effectuator engine generates actions for the second XR person 42C that include detecting and interacting with XR representations of physical elements (e.g., the second XR person 42C is manipulating the XR door handle 20C to open the XR door 18C).

Figure 4:
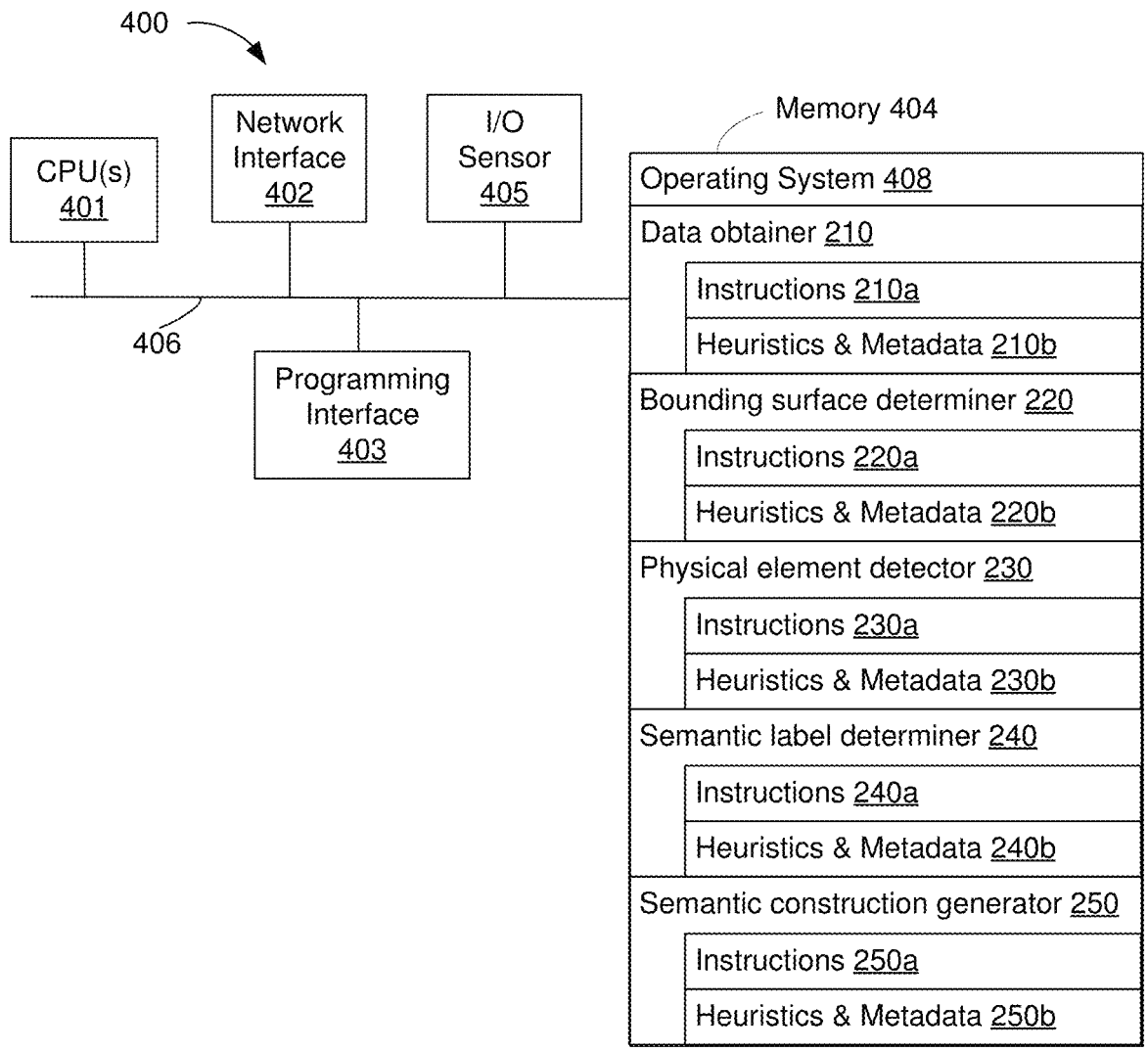
FIG. 4 is a block diagram of a device enabled with various components that generate a semantic construction of a physical environment in accordance with some implementations.

FIG. 4 is a block diagram of a device 400 (e.g., the electronic device 100 shown in FIG. 1A and/or the device 200 shown in FIG. 2) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, input/output (I/O) sensors 405 and one or more communication buses 406 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 406 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the I/O sensor 405 includes an image sensor (e.g., a camera) that captures images and/or videos of a physical environment. In some implementations, the I/O sensor 405 includes a depth sensor that captures depth data for a physical environment.

In some implementations, the memory 404 or the non-transitory computer readable storage medium of the memory 404 stores the following programs, modules and data structures, or a subset thereof including an optional operating system 408, the data obtainer 210, the bounding surface determiner 220, the physical element detector 230, the semantic label determiner 240, the semantic construction generator 250. As described herein, in various implementations, the data obtainer 210 obtains environmental data corresponding to a physical environment. To that end, the data obtainer 210 includes instructions 210a, and heuristics and metadata 210b. As described herein, in various implementations, the bounding surface determiner 220 determines a bounding surface of the physical environment. To that end, the bounding surface determiner 220 includes instructions 220a, and heuristics and metadata 220b. As described herein, in various implementations, the physical element detector 230 detects physical elements that are located within the physical environment based on the environmental data. To that end, the physical element detector 230 includes instructions 230a, and heuristics and metadata 230b. As described herein, in various implementations, the semantic label determiner 240 determines a semantic label for the physical element. To that end, the semantic label determiner 240 includes instructions 240a, and heuristics and metadata 240b. As described herein, in various implementations, the semantic construction generator 250 generates a semantic construction of the physical environment based on the environmental data. To that end, the semantic construction generator 250 includes instructions 250a, and heuristics and metadata 250b.

In various implementations, an XR representation of a virtual intelligent agent (VIA) performs an action in order to satisfy (e.g., complete or achieve) an objective of the VIA. In some implementations, the VIA obtains the objective from a human operator (e.g., a user of a device). In some implementations, an XR representation of the VIA (e.g., an XR object representing the VIA) obtains the objective from an XR representation of the human operator. For example, the XR representation of the human operator instructs the XR representation of the VIA to perform an action in the XR environment. As such, in some implementations, the VIA performs the action by manipulating the XR representation of the VIA in the XR environment. In some implementations, the XR representation of the VIA is able to perform XR actions that the XR representation of the human operator is incapable of performing. In some implementations, the XR representation of the VIA performs XR actions based on information that the VIA obtains from a physical environment. For example, the XR representation of the VIA nudges the XR representation of the human operator when the VIA detects ringing of a doorbell in the physical environment.

In various implementations, an XR representation of an objective-effectuator performs an action in order to satisfy (e.g., complete or achieve) an objective of the objective-effectuator. In some implementations, an objective-effectuator is associated with a particular objective, and the XR representation of the objective-effectuator performs actions that improve the likelihood of satisfying that particular objective. In some implementations, XR representations of the objective-effectuators are referred to as object representations, for example, because the XR representations of the objective-effectuators represent various objects (e.g., real objects, or fictional objects). In some implementations, an objective-effectuator representing a character is referred to as a character objective-effectuator. In some implementations, a character objective-effectuator performs actions to effectuate a character objective. In some implementations, an objective-effectuator representing an equipment is referred to as an equipment objective-effectuator. In some implementations, an equipment objective-effectuator performs actions to effectuate an equipment objective. In some implementations, an objective-effectuator representing an environment is referred to as an environmental objective-effectuator. In some implementations, an environmental objective-effectuator performs environmental actions to effectuate an environmental objective.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including a non-transitory memory and one or more processors coupled with the non-transitory memory:
obtaining environmental data corresponding to a physical environment;
determining, based on the environmental data, a bounding surface of the physical environment;
detecting a physical element located within the physical environment based on the environmental data;
determining a semantic label for the physical element based on at least a portion of the environmental data corresponding to the physical element;
generating a semantic construction of the physical environment based on the environmental data, wherein the semantic construction of the physical environment includes a representation of the bounding surface, a representation of the physical element and the semantic label for the physical element; and
providing the semantic construction of the physical environment to a virtual intelligent agent (VIA) that generates actions for a graphical object that represents the VIA.

2. The method of claim 1, wherein detecting the physical element comprises performing instance segmentation on the environmental data in order to detect the physical element.

3. The method of claim 1, wherein detecting the physical element comprises identifying an optical machine-readable representation of data associated with the physical element.

4. The method of claim 3, wherein the optical machine-readable representation of data includes a barcode, and wherein obtaining the environmental data comprises scanning the barcode.

5. The method of claim 1, wherein determining the semantic label comprises performing semantic segmentation on at least a portion of the environmental data corresponding to the physical element in order to determine the semantic label for the physical element.

6. The method of claim 1, wherein determining the semantic label comprises identifying one or more properties associated with the physical element, and selecting the semantic label based on the one or more properties associated with the physical element.

7. The method of claim 1, wherein determining the semantic label comprises performing an image search based on a portion of the environmental data corresponding to the physical element, and receiving the semantic label as a search result.

8. The method of claim 1, wherein generating the semantic construction comprises determining a placement of the representation of the physical element in relation to the representation of the bounding surface.

9. The method of claim 8, wherein determining the placement of the representation of the physical element comprises determining an orientation of the representation of the physical element within the semantic construction.

10. The method of claim 1, further comprising:
generating, based on the semantic construction of the physical environment, a graphical setting that corresponds to the physical environment, wherein the graphical setting includes a graphical object that represents the physical element.

11. The method of claim 10, further comprising:
displaying the graphical setting with the graphical object.

12. The method of claim 1, further comprising:
providing the semantic construction of the physical environment to an objective-effectuator engine that generates actions for a graphical object representing an objective-effectuator that is instantiated in a graphical setting.

13. The method of claim 1, wherein the bounding surface includes a physical surface in the physical environment.

14. The method of claim 13, wherein the bounding surface includes a floor, a ceiling, or a wall in the physical environment.

15. The method of claim 1, wherein determining the bounding surface includes identifying a boundary associated with the physical environment and representing the boundary with a representation of a surface in the semantic construction of the physical environment.

16. The method of claim 15, wherein identifying the boundary includes identifying a plot line associated with the physical environment based on information stored in a datastore.

17. The method of claim 15, further comprising:
adding a representation of a wall in the semantic construction along the boundary.

18. A device comprising:
one or more processors;
a non-transitory memory;
one or more displays; and
one or more programs stored in the non-transitory memory, which, when executed by the one or more processors, cause the device to:
obtain environmental data corresponding to a physical environment;
determine, based on the environmental data, a bounding surface of the physical environment;
detect a physical element located within the physical environment based on the environmental data;
determine a semantic label for the physical element based on at least a portion of the environmental data corresponding to the physical element;
generate a semantic construction of the physical environment based on the environmental data, wherein the semantic construction of the physical environment includes a representation of the bounding surface, a representation of the physical element and the semantic label for the physical element; and
provide the semantic construction of the physical environment to a virtual intelligent agent (VIA) that generates actions for a graphical object that represents the VIA.

19. The device of claim 18, wherein determining the semantic label comprises performing semantic segmentation on at least a portion of the environmental data corresponding to the physical element in order to determine the semantic label for the physical element.

20. The device of claim 18, wherein determining the semantic label comprises identifying one or more properties associated with the physical element, and selecting the semantic label based on the one or more properties associated with the physical element.

21. The device of claim 18, wherein determining the semantic label comprises performing an image search based on a portion of the environmental data corresponding to the physical element, and receiving the semantic label as a search result.

22. A non-transitory memory storing one or more programs, which, when executed by one or more processors of a device with a display, cause the device to:

obtain environmental data corresponding to a physical environment;

determine, based on the environmental data, a bounding surface of the physical environment;

detect a physical element located within the physical environment based on the environmental data;

determine a semantic label for the physical element based on at least a portion of the environmental data corresponding to the physical element;

generate a semantic construction of the physical environment based on the environmental data, wherein the semantic construction of the physical environment includes a representation of the bounding surface, a representation of the physical element and the semantic label for the physical element; and provide the semantic construction of the physical environment to an objective-effectuator engine that generates actions for a graphical object representing an objective-effectuator that is instantiated in a graphical setting.

23. The non-transitory memory of claim 22, wherein the one or more programs which, when executed by the one or more processors of the device with the display, further cause the device to:

provide the semantic construction of the physical environment to a virtual intelligent agent (VIA) that generates actions for a graphical object that represents the VIA.

24. The non-transitory memory of claim 22, wherein determining the semantic label comprises performing semantic segmentation on at least a portion of the environmental data corresponding to the physical element in order to determine the semantic label for the physical element.

25. The non-transitory memory of claim 22, wherein determining the semantic label comprises identifying one or more properties associated with the physical element, and selecting the semantic label based on the one or more properties associated with the physical element.

26. The non-transitory memory of claim 22, wherein determining the semantic label comprises performing an image search based on a portion of the environmental data corresponding to the physical element, and receiving the semantic label as a search result.

* * * * *